(12) United States Patent  (10) Patent No.: US 8,217,714 B2
Kondo  (45) Date of Patent: Jul. 10, 2012

(54) MICROCOMPUTER INCLUDING REMOTE CONTROLLED LIGHT-RECEIVING DEVICE WITH POWER SUPPLY SWITCH

(75) Inventor: Hideo Kondo, Ora-gun (JP)

(73) Assignees: SANYO Semiconductor Co., Ltd., Gunma (JP); Semiconductor Components Industries, LLC, Phoenix, AZ (US)

( * ) Notice: Subject to any disclaimer, the term of this patent is extended or adjusted under 35 U.S.C. 154(b) by 107 days.

(21) Appl. No.: 12/888,693

(22) Filed: Sep. 23, 2010

(65) Prior Publication Data
US 2011/0080210 A1 Apr. 7, 2011

(30) Foreign Application Priority Data
Oct. 6, 2009 (JP) ................................. 2009-232465

(51) Int. Cl.
*G11C 5/14* (2006.01)
*H03K 17/18* (2006.01)
(52) U.S. Cl. ........................................ 327/544; 365/227
(58) Field of Classification Search .................... 327/544
See application file for complete search history.

(56) References Cited

U.S. PATENT DOCUMENTS

| 6,747,567 B2 * | 6/2004 | Amano et al. | 340/12.16 |
| 6,947,296 B2 * | 9/2005 | Hirosawa | 363/20 |
| 2011/0033194 A1 * | 2/2011 | Kondo | 398/202 |

FOREIGN PATENT DOCUMENTS
JP 2003-87195 3/2003
* cited by examiner

*Primary Examiner* — Lincoln Donovan
*Assistant Examiner* — Terry L Englund
(74) *Attorney, Agent, or Firm* — Morrison & Foerster LLP

(57) ABSTRACT

A power consumption of a light-receiving device is reduced while a power consumption of a microcomputer that controls the light-receiving device is reduced as well. The microcomputer is structured to include a drive circuit, a sampling/detection circuit, a timer, a system clock generation circuit, a CPU, a ROM and a RAM. The CPU stops providing the light-receiving device with a power supply by turning off a P channel type MOS transistor with the drive circuit and sets the microcomputer in a standby state for a predetermined period of time. When the microcomputer is released from the standby state, the CPU starts providing the light receiving device with the power supply by turning the P channel type MOS transistor on with the drive circuit.

6 Claims, 7 Drawing Sheets

MICROCOMPUTER INCLUDING REMOTE CONTROLLED LIGHT-RECEIVING DEVICE WITH POWER SUPPLY SWITCH

CROSS-REFERENCE OF THE INVENTION

This application claims priority from Japanese Patent Application No. 2009-232465, the content of which is incorporated herein by reference in its, entirety.

BACKGROUND OF THE INVENTION

1. Field of the Invention

This invention relates to a microcomputer controlling a light-receiving device that receives a remote control signal from a remote control signal transmitter.

2. Description of the Related Art

Remote-controllable electronic equipment such as a TV, a home stereo system or an air conditioner contains a receiving circuit for a remote control signal. In general, the remote control signal is received by a light-receiving device, the received remote control signal is waveform-shaped, and the waveform-shaped remote control signal is decoded, so that the remote control signal is interpreted.

This kind of electronic equipment is disclosed in Japanese Patent Application Publication No. 2003-87195, for example.

Although the conventional receiving circuit for the remote control signal samples the remote control signal from the light-receiving device at predetermined intervals, there is a problem of a large amount of power consumption, particularly power consumption by the light-receiving device which is always in operation.

This invention is directed to reducing the power consumption by the light-receiving device as well as reducing the power consumption by the microcomputer that controls the light-receiving device.

SUMMARY OF THE INVENTION

The invention provides a microcomputer that includes a memory storing a program and a drive circuit driving a switching device. The switching device provides a light-receiving device with a power supply, and the light-receiving device receives a remote control signal. The microcomputer also includes a CPU executing the program stored in the memory. The CPU is configured to switch off, through the drive circuit, the switching device so that the light-receiving device is not provided with the power supply, to set the microcomputer in a standby state for a predetermined period of time and to switch on, through the drive circuit, the switching device so that the light-receiving device is provided with the power supply when the microcomputer is released from the standby state.

The invention also provides a microcomputer that includes a memory storing a program, a CPU executing the program stored in the memory and a drive circuit driving a switching device. The switching device provides a light-receiving device with a power supply, and the light-receiving device receives a remote control signal. The remote control signal comprises a guide pulse that is transmitted first from a remote control signal transmitter and a data pulse train that is transmitted subsequent to the guide pulse. The CPU is configured to set the microcomputer in a slow operation state and to switch off, through the drive circuit, the switching device so that the light-receiving device is not provided with the power supply for a predetermined period of time and to switch on after the predetermined period of time, through the drive circuit, the switching device so that the light-receiving device is provided with the power supply. The CPU is also configured to switch the microcomputer from the slow operation state to a fast operation state and to decode the data pulse train according to the program stored in the memory when the guide pulse is detected in the remote control signal inputted from the light-receiving device.

DETAILED DESCRIPTION OF THE INVENTION

Figure 1:
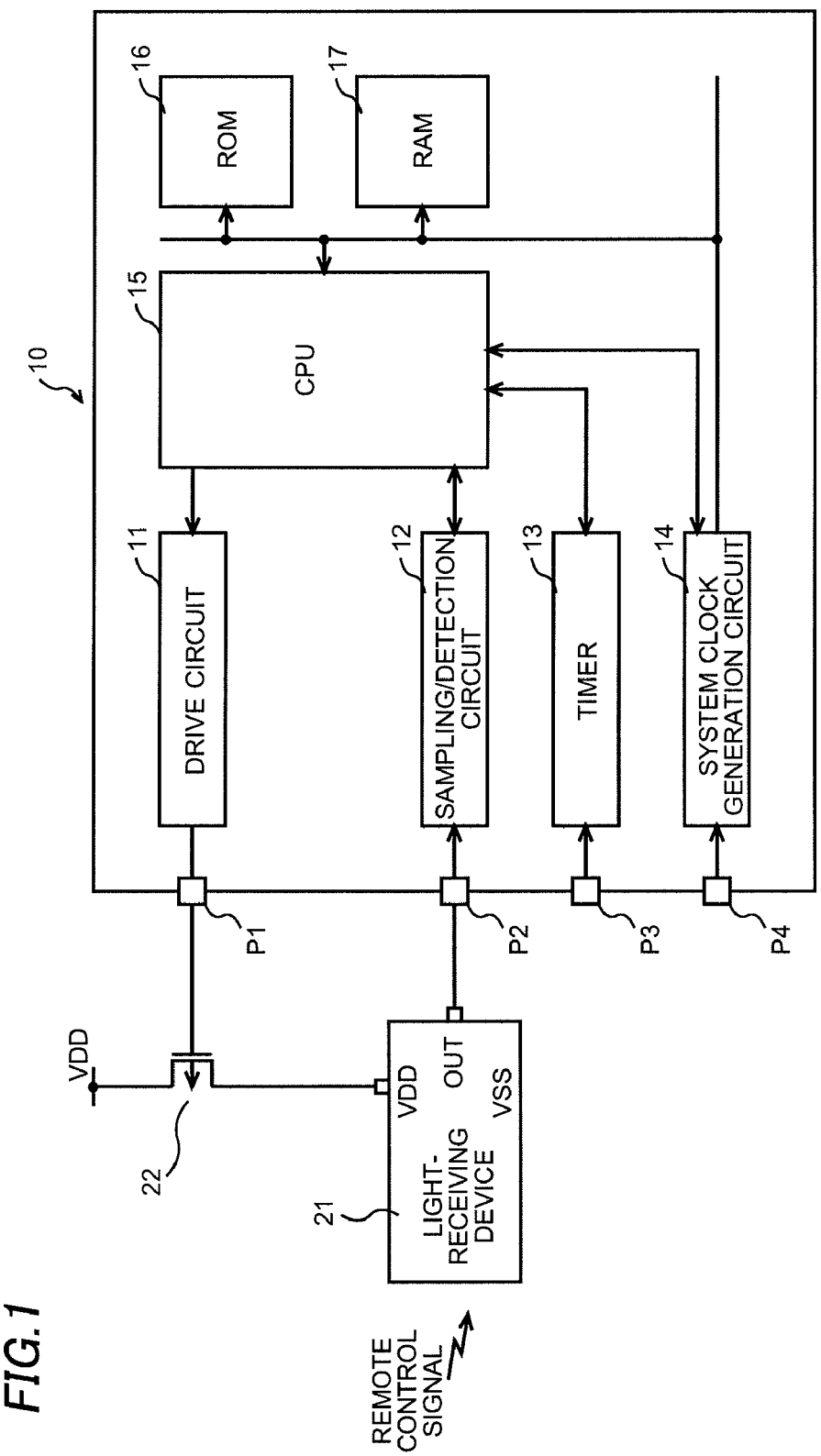
FIG. 1 shows a structure of a microcomputer according to a first embodiment of this invention.

A first embodiment of this invention is described referring to the drawings. FIG. 1 shows a structure of a microcomputer 10 according to the first embodiment of this invention.

The microcomputer 10 is structured to include a drive circuit 11, a sampling/detection circuit 12, a timer 13, a system clock generation circuit 14, a CPU 15, a ROM 16 as an example of a "memory" and a RAM 17.

A light-receiving device 21 and a P channel type MOS transistor 22 (an example of "switching device") that turns on and off in response to a drive signal from the drive circuit 11 so as to control providing the light-receiving device 21 with a power supply are disposed outside the microcomputer 10. Other type of switching device such as a bipolar transistor may be disposed in place of the P channel type MOS transistor 22.

The light-receiving device 21 receives a remote control signal transmitted from a remote control signal transmitter, and shapes a waveform of the remote control signal that is received. In this case, the remote control signal transmitted from the remote control signal transmitter includes a burst signal formed of a predetermined carrier frequency. The light-receiving device 21 receives the burst signal and shapes the waveform of the signal (including filtering).

The light-receiving device 21 outputs the waveform-shaped remote control signal as an output signal from its output terminal OUT. In the case where the remote control signal is an infrared radiation signal, the light-receiving device 21 is an infrared radiation receiving device. Or, in the case where the remote control signal is a radio wave signal, the light-receiving device 21 is a radio wave receiving device.

To describe the structure of the microcomputer 10, the drive circuit 11 outputs the drive signal to a terminal P1. The drive signal is applied to a gate of the P channel type MOS transistor 22 through the terminal P1. A source of the P channel type MOS transistor 22 is provided with a power supply electric potential VDD (+5 V, for example) that is common to the microcomputer 10, and its drain is connected to a power supply terminal of the light-receiving device 21.

As a result, when the drive signal is at a low level, the P channel type MOS transistor 22 is turned on and the light-receiving device 21 is provided with the power supply electric potential VDD through the P channel type MOS transistor 22, so that the light-receiving device 21 is put into an operation state.

When the drive signal is at a high level, on the other hand, the P channel type MOS transistor is turned off and providing the light-receiving device 21 with the power supply electric potential VDD is stopped, so that the light-receiving device 21 is put into a halt state. That is, when the drive signal alternates between the low level and the high level, the light-receiving device 21 operates intermittently in response to the drive signal. By doing so, it is made possible that the power consumption of the light-receiving device 21 is reduced.

The sampling/detection circuit 12 samples the output signal (waveform-shaped remote control signal) outputted from the output terminal OUT of the light-receiving device 21 in response to a sampling signal, and detects sampled output signal of the light-receiving device 21.

The timer 13 counts the time based on a low frequency (32 KHz, for example) clock inputted from a terminal P3. The low frequency clock can be generated using a quartz resonator, for example.

The system clock generation circuit 14 generates a system clock based on a high frequency (10 MHz, for example) clock inputted from a terminal P4. The system clock is fed to the drive circuit 11, the sampling/detection circuit 12, the CPU 15, the ROM 16, the RAM 17 and other primary circuits in order to make them operate. The high frequency clock may be generated by an oscillation circuit disposed inside the microcomputer 10.

The CPU 15 controls whole the system, that is, the drive circuit 11, the sampling/detection circuit 12, the timer 13, the system clock generation circuit 14, the ROM 16, the RAM 17 and the like according to the program stored in the ROM 16. In particular, the CPU 15 puts the microcomputer 10 into a standby state in order to reduce the power consumption.

In the standby state, only the timer 13 is in operation and all the other circuits halt their operations. That is, feeding the system clock is stopped in the standby state by halting the operation of the system clock generation circuit 14.

In the circuits to which feeding the system clock is stopped, logic states of inputs and outputs of logic gates (AND circuit, NOR circuit, inverter circuit and the like) constituting the circuits are fixed at either "1" or "0". As a result, in the standby state, only a leakage current flows and the power consumption is reduced in the circuits to which feeding the system clock is stopped. These circuits are often formed of CMOS. The standby state lasts for a predetermined period of time that is set in the timer 13.

The system clock generation circuit 14 starts its operation in response to a timer signal telling that the timer 13 completed counting the predetermined period of time. With that, feeding the system clock is restarted and the microcomputer 10 is released from the standby state.

Figure 2:
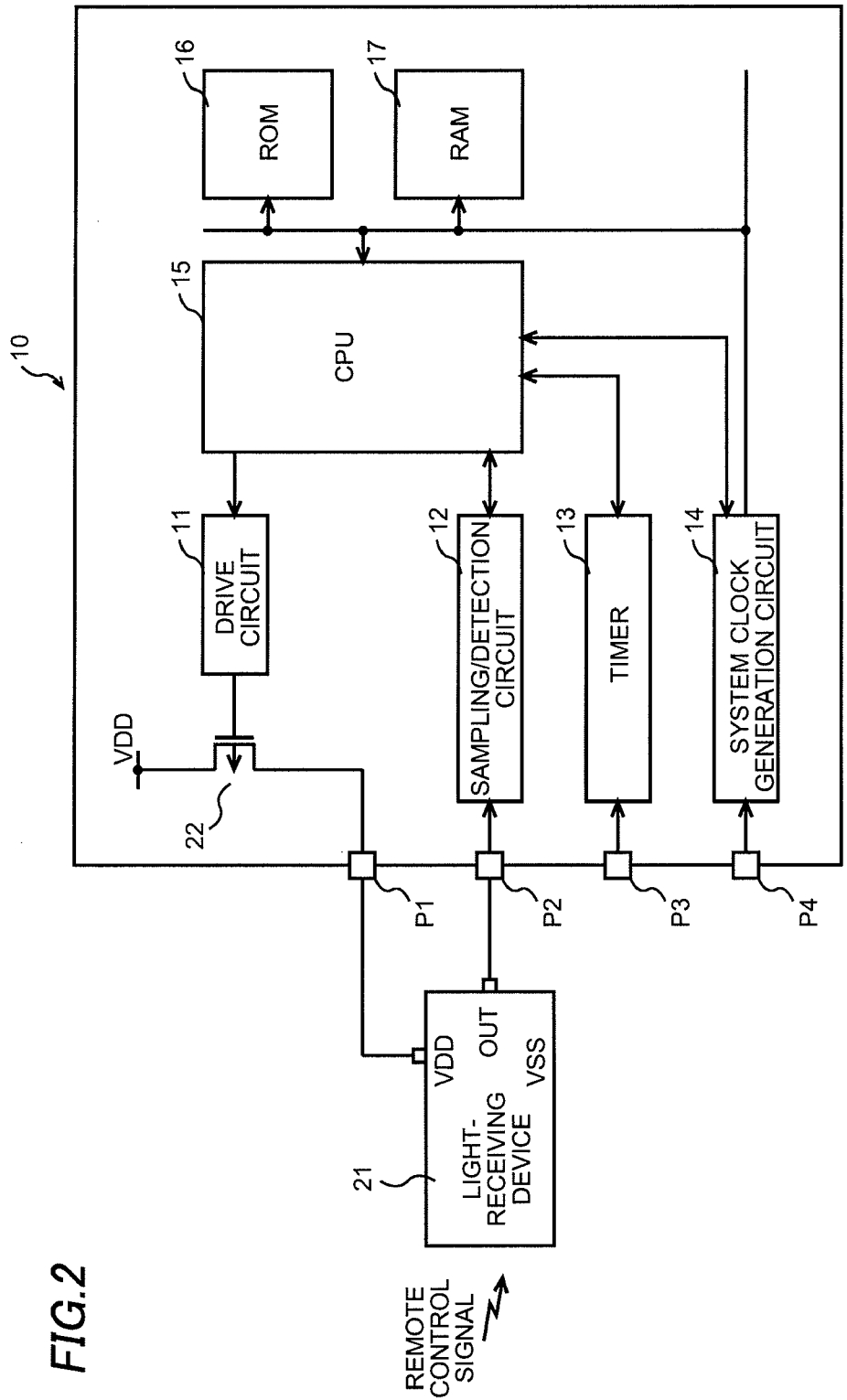
FIG. 2 shows a structure of the microcomputer according to the first embodiment of this invention.

The P channel type MOS transistor 22 may be disposed inside the microcomputer 10, as shown in FIG. 2. In this case, the drive signal from the drive circuit 11 is directly applied to the gate of the P channel type MOS transistor 22, and the drain of the P channel type MOS transistor 22 is connected to the power supply terminal of the light-receiving device 21 through the terminal P1.

Figure 3:
FIG. 3 is a timing chart showing an example of operations of the microcomputer according to the first embodiment of this invention.
Figure 4:
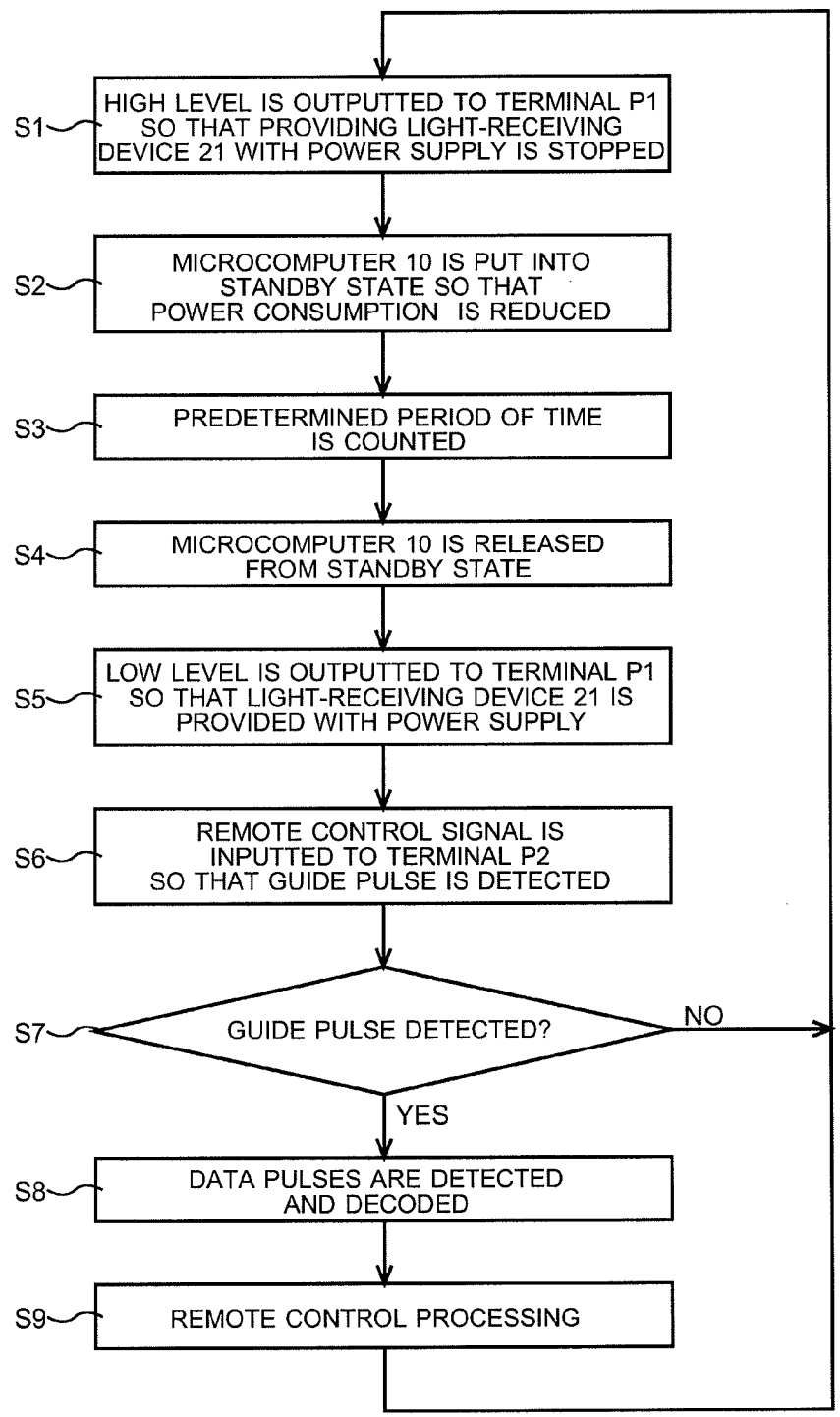
FIG. 4 is a flow chart showing a sequence of the example of operations of the microcomputer according to the first embodiment of this invention.

Next, an example sequence of operations of the microcomputer 10 according to the first embodiment is explained referring to FIG. 3 and FIG. 4. The CPU 15 controls the operations of the microcomputer 10 according to the program stored in the ROM 16. The remote control signal first transmitted from the remote control signal transmitter includes a guide pulse (a kind of start pulse) and a data pulse train that is made of a predetermined number of bits (8 bits, for example) and is transmitted subsequent to the guide pulse. The guide pulse is a kind of start signal to foretell coming of the data pulse train, while the data pulse train includes commands for controlling the electronic equipment.

First, in a remote control signal waiting state, the light-receiving device 21 makes the intermittent operation to alternate between the operation state and the halt state. In synchronization with it, the microcomputer 10 alternates between the operation state and the standby state. With this, the power consumption of the whole system including the light-receiving device 21 and the microcomputer 10 is reduced. An interval of the intermittent operation is 500 μsec, for example.

The terminal P1 is set to the high level by the drive signal from the drive circuit 11 in a step S1 shown in FIG. 4. Since the P channel type MOS transistor 22 is turned off as a result, providing the light-receiving device 21 with the power supply electric potential VDD is stopped and the light-receiving device 21 is put into the halt state. In a subsequent step S2, the microcomputer 10 is put into the standby state described above in order to reduce the power consumption. In a subsequent step S3, the timer 13 counts the predetermined period of time. The microcomputer 10 is released from the standby state when the timer 13 completes counting the predetermined period time (step S4).

In a subsequent step S5, the terminal P1 is set to the low level by the drive signal from the drive circuit 11. Since the P channel type MOS transistor 22 is turned on as a result, providing the light-receiving device 21 with the power supply electric potential VDD is started. With this, the light-receiving device 21 is put into a state in which the remote control signal can be received. And it becomes possible that the remote control signal from the light-receiving device 21 is inputted to the terminal P2 of the microcomputer 10 (step S6).

In a subsequent step S7, the sampling/detection circuit 12 detects whether there is the guide pulse in the remote control signal outputted from the output terminal OUT of the light-receiving device 21, in response to the sampling signal generated while the light-receiving device 21 is in operation. In this case, the guide pulse means a negative polarity pulse varying from the high level to the low level outputted from the light-receiving device 21. It is noted that the guide pulse could be a positive polarity pulse varying from the low level to the high level when the logic levels would be reversed. When the guide pulse is not detected, the sequence returns to the step S1. That is, the steps S1 through S7 are repeated as long as the guide pulse is not detected.

When the guide pulse is detected in the step S7, the sequence advances to a next step S8. The light-receiving device 21 and the microcomputer 10 are in the operation state in the step S8. In the step S8, the data pulse train is outputted from the light-receiving device 21 subsequently to the guide pulse, and sequentially detected by the sampling/detection circuit 12.

The CPU 15 decodes the data pulse train according to the program stored in the ROM 16, that is, interprets the remote control signal.

In a subsequent step S9, the CPU 15 executes remote control processing, that is, controlling the electronic equipment (power-on, changing the channel or controlling the volume of the TV, for example) based on the result of the decoding. When the remote control processing in the step S9 is completed, the sequence returns to the step S1, that is, the state waiting for the next remote control signal.

It is preferable for prevention of malfunctioning that the detection of the guide pulse, that is, the detection of the low level of the guide pulse is repeated a plurality of times (5-6 times, for example) in the step S7. That is because there is a possibility that a noise pulse is mistakenly detected as the guide pulse with a single detection, since the guide pulse is usually a single pulse.

In this case, the intermittent operation of the light-receiving device 21 and the microcomputer 10 is repeated a plurality of times, as shown in FIG. 3. To describe the case referring to the flow chart shown in FIG. 4, a loop of the steps S1-S7 is repeated a plurality of times after the guide pulse is detected in the step S7 for the first time.

When the guide pulse is always detected in the plurality of detections that follow, the CPU 15 judges that the guide pulse has arrived really, and lets the sequence advance from the step S7 to the step S8.

After providing the light-receiving device 21 with the power supply electric potential VDD is started in the step S5, it takes a predetermined length of time depending on characteristics of the light-receiving device 21 before the light-receiving device 21 becomes ready to receive the remote control signal. Therefore, when the sampling signal that is generated in the step S7 is generated before the light-receiving device 21 becomes ready to receive the remote control signal, the sampling/detection circuit 12 cannot detect the guide pulse in the remote control signal.

Thus, it is preferable that the CPU 15 is able to adjust the timing to generate the sampling signal so that the sampling signal is generated after the light-receiving device 21 becomes ready to receive the remote control signal in order to make the detection of the guide pulse possible.

Also, it is preferable that a frequency of the sampling signal in the step S8 is higher than that in the intermittent operation in order to detect the plurality of data pulses sequentially.

According to the first embodiment, as described above, the power consumption of the light-receiving device 21 can be reduced while the power consumption of the microcomputer 10 that controls the light-receiving device 21 is reduced.

Figure 5:
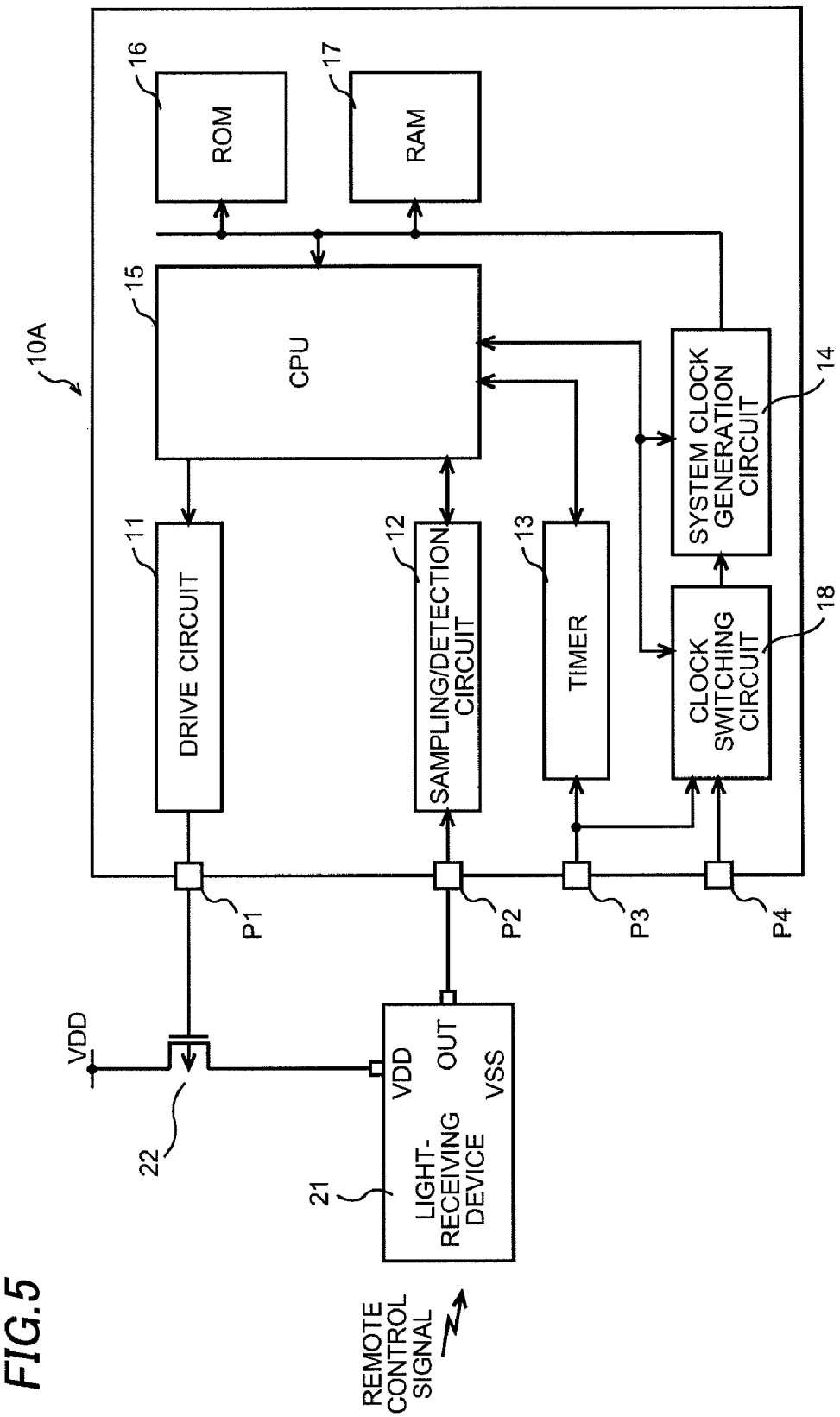
FIG. 5 shows a structure of a microcomputer according to a second embodiment of this invention.

A second embodiment of this invention is described referring to the drawings. FIG. 5 shows a structure of a microcomputer 10A according to the second embodiment of this invention. In the first embodiment, the light-receiving device 21 and the microcomputer 10 perform intermittent operation in the remote control signal waiting state.

In the second embodiment, on the other hand, the CPU 15 lets only the light-receiving device 21 perform the intermittent operation. That is, the microcomputer 10A is kept in a slow operation state instead of alternating between the standby state and the operation state. After the guide pulse is detected, the microcomputer 10A is put into a fast operation state.

While a consumption current of the light-receiving device 21 is 2-3 mA in many cases, a consumption current of the microcomputer 10A in the slow operation state (frequency of the system clock is 32 KHz, for example) is about 50 μA which is negligibly small compared with the consumption current of the light-receiving device 21.

After the guide pulse is detected, the microcomputer 10A is put into the fast operation state (frequency of the system clock is 10 MHz, for example) in order to perform the detection of the data pulses and the remote control processing at a high speed. At that time, the consumption current of the microcomputer 10A is about 5 mA.

Therefore, the power consumption of the whole system including the light-receiving device 21 and the microcomputer 10A can be reduced sufficiently even when the microcomputer 10A is not put into the standby state.

The microcomputer 10A has a clock switching circuit 18 in addition to the structure of the microcomputer 10 according to the first embodiment in order to realize the operations described above. The clock switching circuit 18 is controlled by the CPU 15 so as to provide the system clock generation circuit 14 with the low frequency clock (32 KHz, for example) inputted from the terminal P3 in the remote control signal waiting state (in the slow operation state).

And the clock switching circuit 18 provides the system clock generation circuit 14 with the high frequency clock (10 MHz, for example) inputted from the terminal P4 after the guide pulse is detected (in the fast operation state). The low frequency clock is inputted to the timer 13 as in the first embodiment.

In the second embodiment also, the P channel type MOS transistor 22 may be disposed inside the microcomputer 10A.

Figure 6:
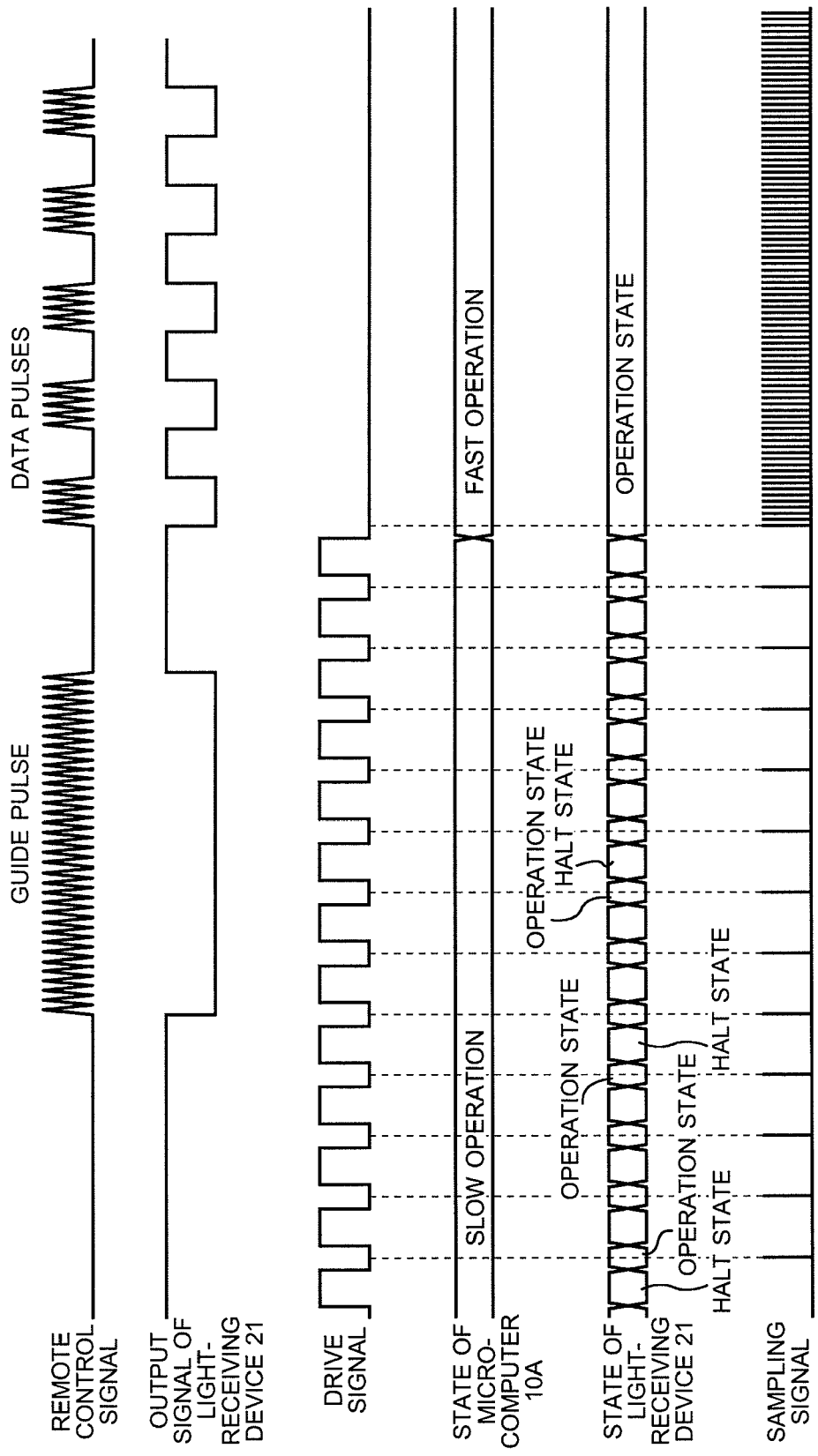
FIG. 6 is a timing chart showing an example of operations of the microcomputer according to the second embodiment of this invention.
Figure 7:
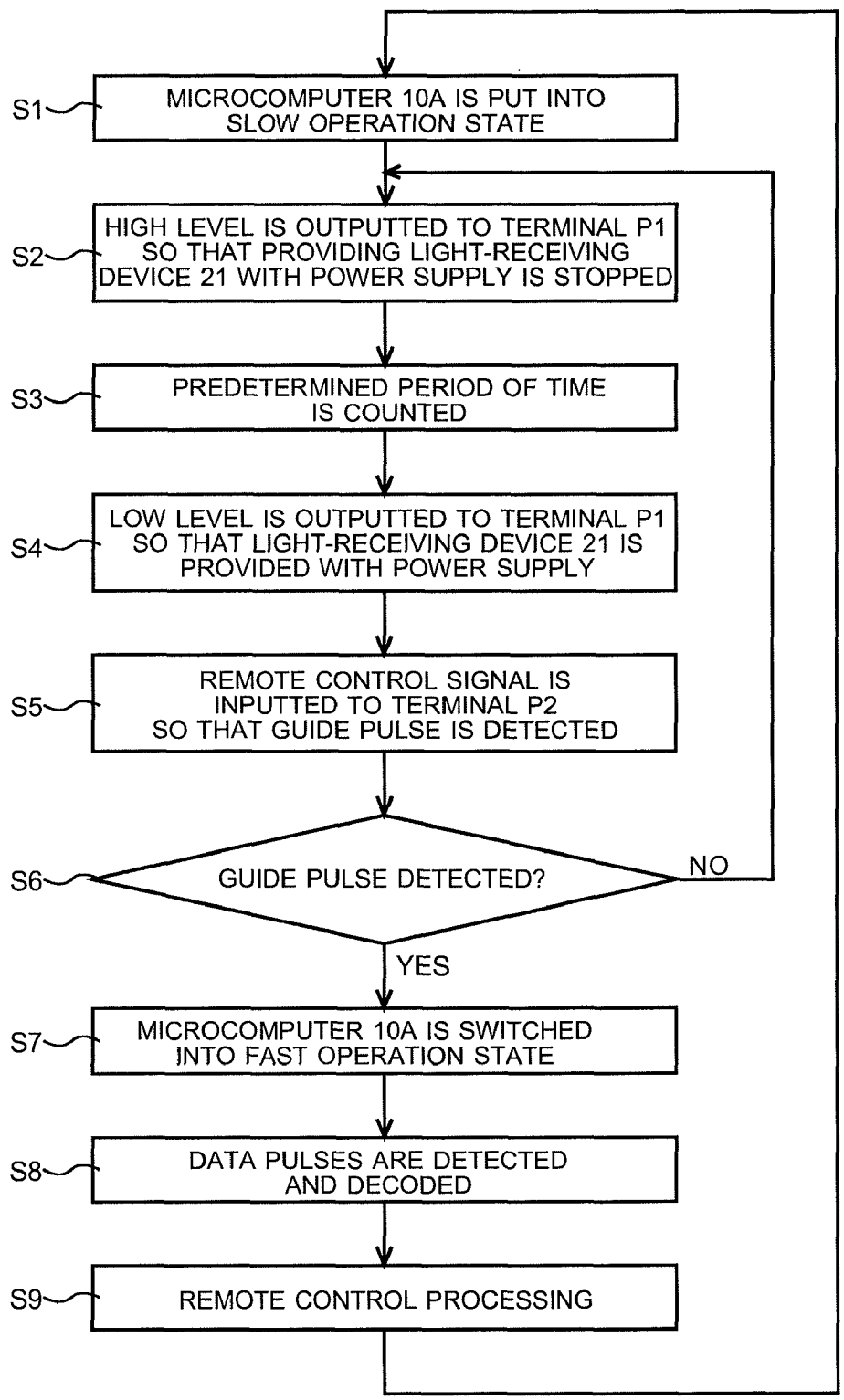
FIG. 7 is a flow chart showing a sequence of the example of operations of the microcomputer according to the second embodiment of this invention.

Next, an example sequence of operations of the microcomputer 10A according to the second embodiment is described referring to FIG. 6 and FIG. 7. The CPU 15 controls the operations of the microcomputer 10A according to the program stored in the ROM 16. The remote control signal first transmitted from the remote control signal transmitter includes the guide pulse (a kind of start pulse) and the data pulse train that is made of a predetermined number of bits (8 bits, for example) and is transmitted subsequent to the guide pulse.

First, in the remote control signal waiting state, the microcomputer 10A is put into the slow operation state (step S1). In a subsequent step S2, the terminal P1 is set to the high level by the drive signal from the drive circuit 11. Since the P channel type MOS transistor 22 is turned off as a result, providing the light-receiving device 21 with the power supply electric potential VDD is stopped and the light-receiving device 21 is put into the halt state.

In a subsequent step S3, the timer 13 counts the predetermined period of time. When the timer 13 completes counting the predetermined period of time, the terminal P1 is set to the low level by the drive signal from the drive circuit 11 (step S4). Since the P channel type MOS transistor 22 is turned on as a result, providing the light-receiving device 21 with the power supply electric potential VDD is started and the light-receiving device 21 is put into the operation state. With this, it becomes possible that the remote control signal from the light-receiving device 21 is inputted to the terminal P2 (step S5).

In a subsequent step S6, the sampling/detection circuit 12 detects whether there is the guide pulse in the remote control signal outputted from the output terminal OUT of the light-receiving device 21, in response to the sampling signal generated while the light-receiving device 21 is in operation. When the guide pulse is not detected, the sequence returns to the step S2. That is, the steps S2 through S6 are repeated as long as the guide pulse is not detected.

When the guide pulse is detected in the step S6, the sequence advances to a next step S7. The microcomputer 10A is switched into the fast operation state in the step S7.

In a subsequent step S8, a plurality of the data pulses is outputted from the light-receiving device 21 subsequently to the guide pulse, and sequentially detected by the sampling/detection circuit 12. The CPU 15 decodes the data pulse train according to the program stored in the ROM 16, that is, interprets the remote control signal.

In a subsequent step S9, the CPU 15 executes remote control processing, that is, controlling the electronic equipment (power-on, changing the channel or controlling the volume of the TV, for example) based on the result of the decoding. When the remote control processing in the step S9 is completed, the sequence returns to the step S1, that is, the state waiting for the next remote control signal.

It is preferable for prevention of malfunctioning that the detection of the guide pulse is repeated a plurality of times in the step S6 as in the first embodiment. That is because there is a possibility that a noise pulse is mistakenly detected as the guide pulse with a single detection, since the guide pulse is usually a single pulse.

In this case, the intermittent operation of the light-receiving device 21 is repeated a plurality of times, as shown in FIG. 6. To describe the case referring to the flow chart shown in FIG. 7, a loop of the steps S1-S6 is repeated a plurality of times after the guide pulse is detected (that is, the low level is detected) in the step S6 for the first time. When the guide pulse is always detected in the plurality of detections that follow, the sequence is advanced from the step S6 to the step S7.

Also, it is preferable in the second embodiment as in the first embodiment that the CPU 15 is able to adjust the timing to generate the sampling signal so that the sampling signal is generated after the light-receiving device 21 becomes ready to receive the remote control signal in order to make the detection of the guide pulse possible in the step S6.

According to the embodiments of this invention, the power consumption of the light-receiving device can be reduced while the power consumption of the microcomputer that controls the light-receiving device is reduced.

What is claimed is:

1. A microcomputer comprising:
a memory storing a program;
a drive circuit driving a switching device, the switching device providing a light-receiving device with a power supply, the light-receiving device receiving a remote control signal; and
a CPU executing the program stored in the memory, the CPU being configured to switch off, through the drive circuit, the switching device so that the light-receiving device is not provided with the power supply, to set the microcomputer in a standby state for a predetermined period of time and to switch on, through the drive circuit, the switching device so that the light-receiving device is provided with the power supply when the microcomputer is released from the standby state.

2. The microcomputer of claim 1, wherein the remote control signal comprises a guide pulse that is transmitted first from a remote control signal transmitter and a data pulse train that is transmitted subsequent to the guide pulse, and the CPU decodes the data pulse train according to the program stored in the memory when the guide pulse is detected in the remote control signal inputted from the light-receiving device after the switching device is switched on so that the light-receiving device is provided with the power supply.

3. The microcomputer of claim 2, wherein the CPU switches off the switching device and sets the microcomputer in the standby state when the guide pulse is not detected in the remote control signal inputted from the light-receiving device.

4. The microcomputer of claim 1, wherein the switching device is disposed inside the microcomputer.

5. A microcomputer comprising:
a memory storing a program;
a CPU executing the program stored in the memory; and
a drive circuit driving a switching device, the switching device providing a light-receiving device with a power supply, the light-receiving device receiving a remote control signal,
wherein the remote control signal comprises a guide pulse that is transmitted first from a remote control signal transmitter and a data pulse train that is transmitted subsequent to the guide pulse,
the CPU is configured to set the microcomputer in a slow operation state and to switch off, through the drive circuit, the switching device so that the light-receiving device is not provided with the power supply for a predetermined period of time and to switch on after the predetermined period of time, through the drive circuit, the switching device so that the light-receiving device is provided with the power supply, and
the CPU is also configured to switch the microcomputer from the slow operation state to a fast operation state and to decode the data pulse train according to the program stored in the memory when the guide pulse is detected in the remote control signal inputted from the light-receiving device.

6. The microcomputer of claim 5, wherein the CPU switches off the switching device when the guide pulse is not detected in the remote control signal inputted from the light-receiving device.

* * * * *